April 25, 1967 H. LAUFER 3,315,967

ANTI-SKATING DEVICE

Filed Jan. 14, 1966

INVENTOR

Helmut Laufer

By

Ernest G. Montague

Attorney

United States Patent Office 3,315,967

Patented Apr. 25, 1967

3,315,967
ANTI-SKATING DEVICE

Helmut Laufer, St. Georgen, Black Forest, Germany, assignor to Dual Gebruder Steidinger, St. Georgen, Germany, a corporation of Germany Filed Jan. 14, 1966, Ser. No. 520,724
Claims priority, application Germany, Jan. 15, 1965, St 23,210
3 Claims. (Cl. 274—23)

Figures 1, 2:
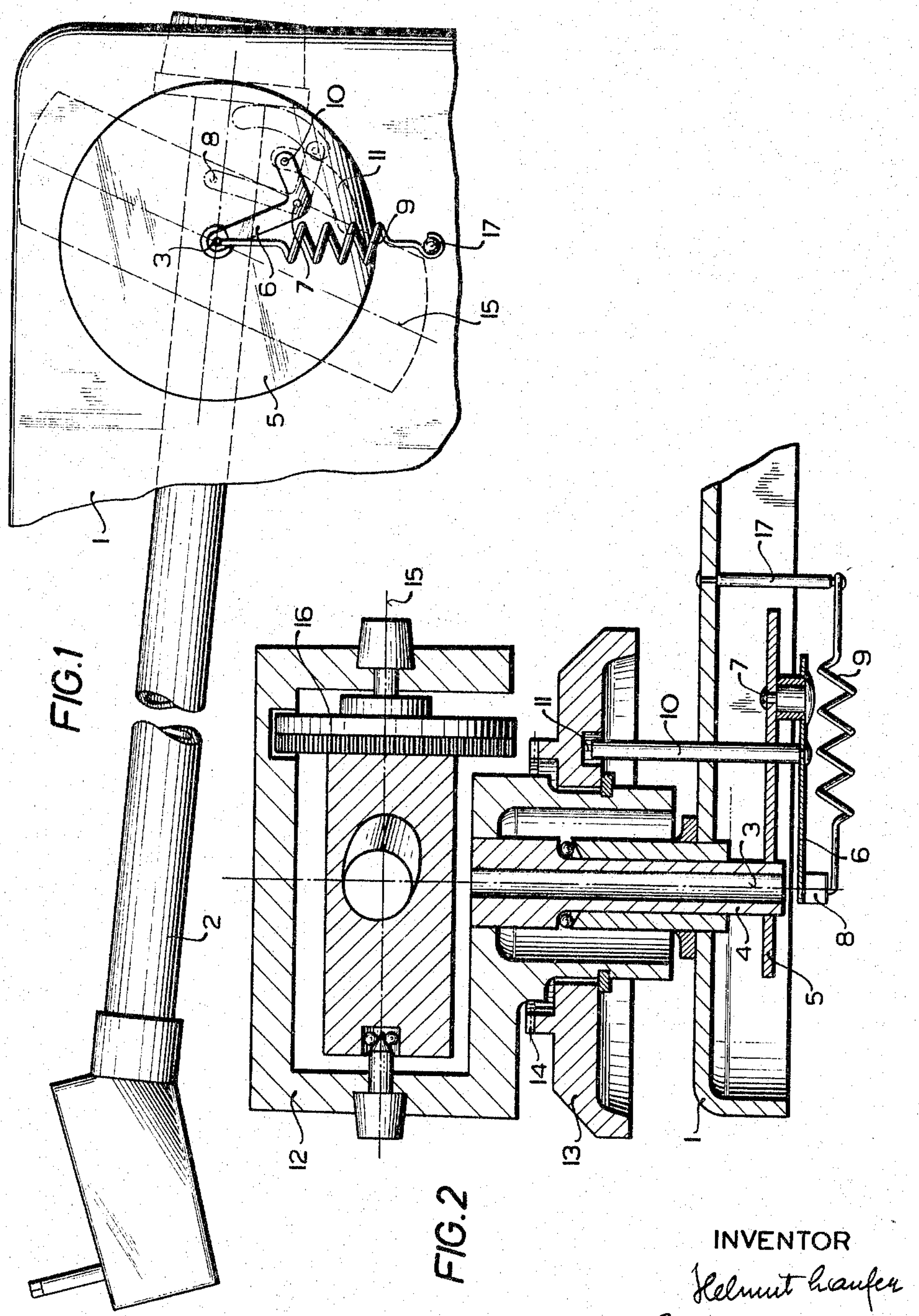

The present invention is directed to an adjustable, so-called anti-skating device, i.e., a device on a phonograph-pickup which scans a record while pivoting about a vertical axis and contains means which exert a rotary moment against the pivoting motion during the scanning operation.

Devices of this type serve the purpose of compensating the torsional moment, which is created as a consequence of the finite length of the pickup and the frictional force between the scanning needle and the record in its vertical pivot axis thereof, so that the bearing pressure of the needle is the same on both flanks of the scanning groove. Such devices are designed adjustably, which is required particularly if the pickup arm bearing weight is variable. Due to the finite length of the pickup arm, the moment is, however, not constant over the entire scanning range of the pickup arm.

According to a known device, the moment is produced by a weight-loaded thread, which is in an eyelet and engages the pickup arm. A change is achieved by displacing the point of application or engagement of the thread on the pickup arm. A device of this type is obstructive both with respect to the general manipulation of the instrument and for the transport thereof.

In another known device, a weight-loaded lever, mounted at the base plate of the instrument, is provided such that it is in engagement with a pin secured in radial direction to the vertical pivot axis of the pickup arm. The friction of such a device is considerable. It involves additionally the danger that, during transportation, the parts gliding upon each other are knocked against each other, which changes the frictional conditions. Specific safety means would be required to eliminate this danger.

Both of the above-mentioned known devices operate flawlessly only in those instances, where the record player is operated exclusively in an at least approximately horizontal position.

While the use of a spring would obviate the difficulties referred to hereinabove, the apparatus required therefor would be relatively complicated since, on the one hand, the spring must have such a flat characteristic that virtually no change in force will occur beyond the conventional pivoting range of the pickup arm and, on the other hand, the force must be adjustable to start practically with zero in accordance with the bearing weight of the pickup arm. This would, however, have the result that the adjustment path of the point of suspension of a spring required for the purpose of adaptation to a variable bearing weight of the pickup arm would become very large, which effect could not be realized with simple means.

It is, therefore, one object of the present invention to provide an anti-skating device, which eliminates the disadvantages and drawbacks of the known devices described hereinabove.

It is another object of the present invention to provide an anti-skating device which, in view of the fact that the value of the compensating force is in a direct ratio to the bearing weight, both, namely the compensating force and the bearing weight are adjusted simultaneously by means of one setting device. Practical experience has shown, however, that the value of the compensating force depends additionally upon other influencing factors, such as, for example, the value of the roundness of the scanning tip which, however, on the other hand, is not altered for each owner of an instrument.

It is a further object of the present invention to provide an anti-skating device which includes means which offers to the user of the instrument both possibilities without rendering the device essentially more complicated and, respectively, without nominal further expenditure.

With these and other objects in view which will become apparent in the following detailed description, the present invention will be clearly understood in connection with the accompanying drawing, in which:

FIGURE 1 is a bottom plan view of a part of a record player including the pickup arm bearing; and FIG. 2 is an axial section of the pickup arm along its pivot axis.

Referring now to the drawing, the anti-skating device comprises a base plate 1 and a pickup arm 2 which is pivotally positioned about a vertical axis 3 at a base plate 1. Disposed below the base plate 1 at a tube 4 being rigidly secured to the pickup arm 2 is a disk 5 upon which a two-armed lever 6 is pivotally mounted about a pin 7. Suspended at one end 8 of the lever 6 is disposed a tension spring 9 which is secured, on the other hand, to the base plate 1. A pin 10 is attached to the other end of the lever 6 and engages in a spiral-shaped recess 11 of a ring 13, sitting on the pickup arm bearing cap 12 and being rotatable against friction. The ring 13 is equally displaceable against friction in axial direction and encloses in its upper position thereof with its toothed rim 14 the outer surfaces of a setting or adjusting ring 16 disposed about a horizontally arranged pickup arm pivot axis 15 for purposes of adjusting the pickup arm bearing weight.

The position illustrated in the drawing corresponds to the compensating force zero, and this position will also not be altered upon repositioning the pickup arm 2, since one of the points of engagement 8 of the spring 9 coincides with the pivot axis 3 of the pickup arm 2. Upon rotation of the ring 13, the pin 10 glides in the spiral-shaped recess 11 and thus pivots the lever 6, for example, into the position thereof, shown in broken lines in the drawing, so that the greatest compensating force has been set. If the pickup arm 2 is pivoted, during scanning about its axis 3, the tension spring 9 is extended, but the increase in force resulting therefrom counteracts a corresponding contraction of the lever arm thereof acting with respect to the axis 3, so that the compensating moment is maintained approximately constant. While, during an intermediate position of the lever 6, the compensating moment is reduced, the equalizing effect between the spring extension and the contraction of the effective lever arm thereof remains unchanged.

While I have disclosed one embodiment of the present invention, it is to be understood that this embodiment is given by example only and not in a limiting sense, the scope of the present invention being determined by the objects and the claims.

I claim:

1. In a record player including a pickup arm carrying a pickup at one end,
 a base plate,
 said pickup arm being pivotally mounted at the other end about a vertical axis and about a horizontal axis on said base plate,
 a member fixedly secured to said pickup arm to rotate therewith about said vertical axis,
 a lever pivotally mounted on said member for a pivot movement between two end positions about an axis disposed parallel to the vertical pivot axis of said pickup arm, means for adjusting said lever, a spring, and one end of said spring being secured with said base plate and the other end of said spring being connected with said lever, the engaging point of said spring on said lever being chosen such that the latter is disposed in one of its end positions in the vertical pivot axis of said pickup arm and the position of the pivot axis of said lever being chosen such that in all other positions of said lever opposite an increase of the distance of the spring engaging points as a result of a pivoting movement of said pickup arm about its vertical axis, a shortening of the distance of an imaginary connecting line between the spring engaging points with respect to the vertical pivot axis of said pickup arm occurs.

2. The record player, as set forth in claim 1, wherein said means for adjusting the lever includes an operating member rotatably mounted about the vertical pivot axis of said pickup arm, said pickup arm including means rigidly secured thereto, friction means between said means and said operating member, said operating member having a recess of spiral-shape relative to said vertical pivot axis of said pickup arm, and a coupling means secured to said lever and received in said recess.

3. The record player, as set forth in claim 2, wherein said means rigidly secured to the pickup arm includes a bearing weight rotatably disposed about said horizontal pivot axis of said pickup arm and having a toothed rim, and said operating member is axially movable in direction of said vertical pivot axis of said pickup arm and having likewise a toothed rim, so that upon axial displacement of said operating member in one end position thereof said toothed rims are in engagement and in the other end position thereof said toothed rims are out of engagement.

No references cited.

LEONARD FORMAN, *Primary Examiner.*

H. N. HAROIAN, *Assistant Examiner.*